Feb. 12, 1929.
MELCHOR CENTENO, V.
1,702,195
PHOTO OSCILLATOR
Filed May 25, 1927  3 Sheets-Sheet 1
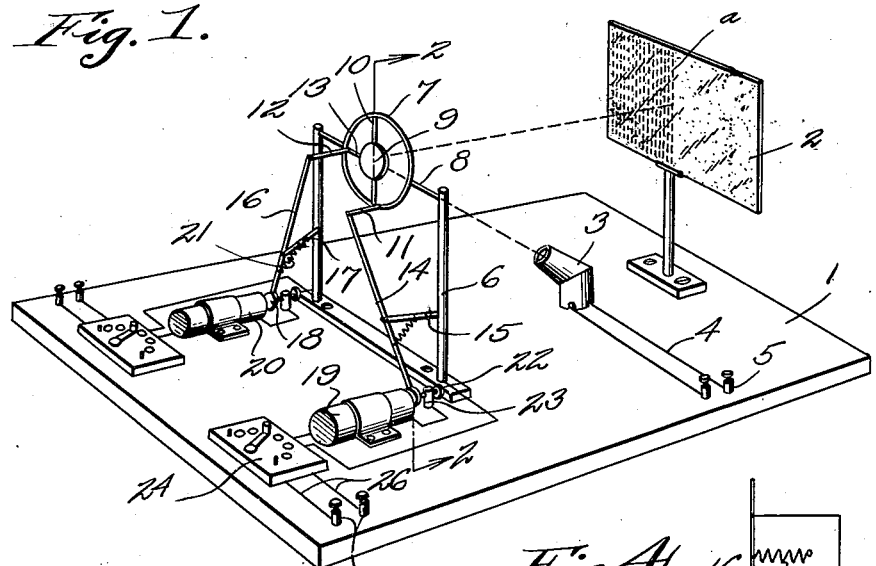
Fig. 1.
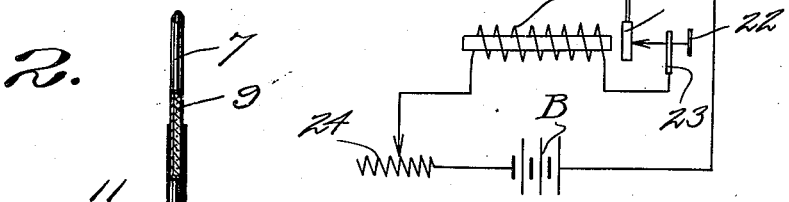
Fig. 4.
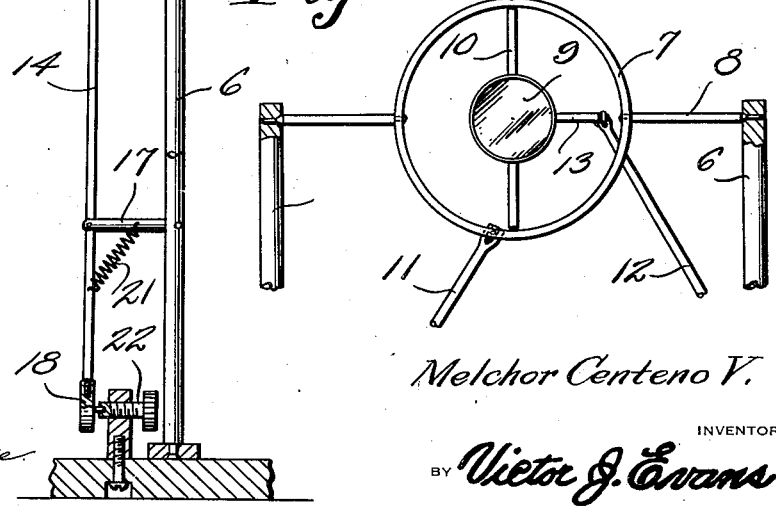
Fig. 2.
Fig. 3.
Melchor Centeno V.
INVENTOR
BY Victor J. Evans
ATTORNEY
WITNESS:

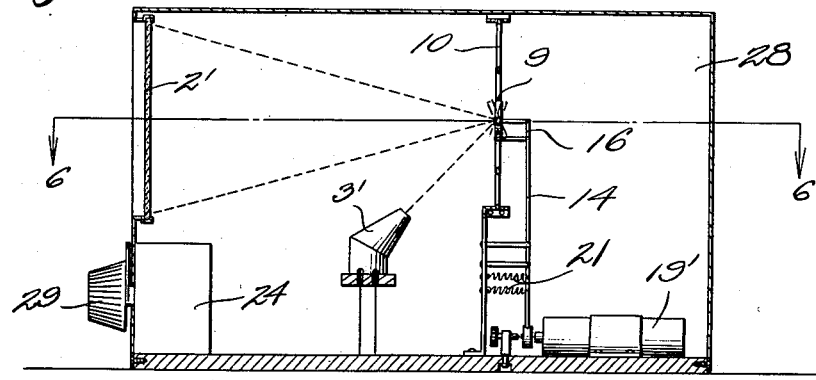
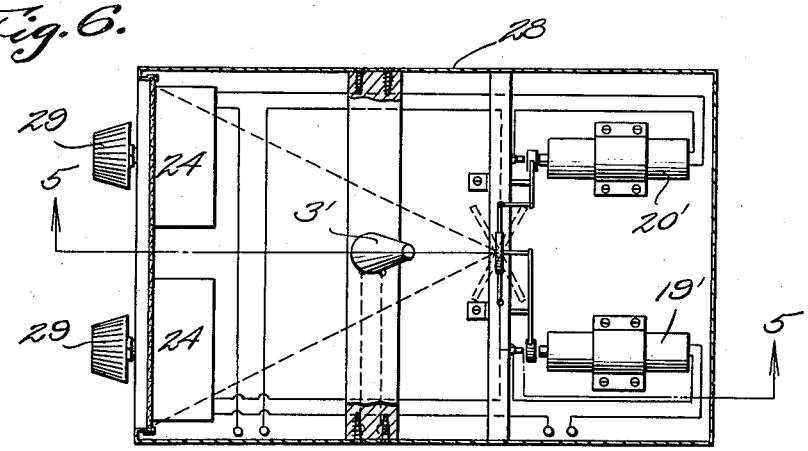
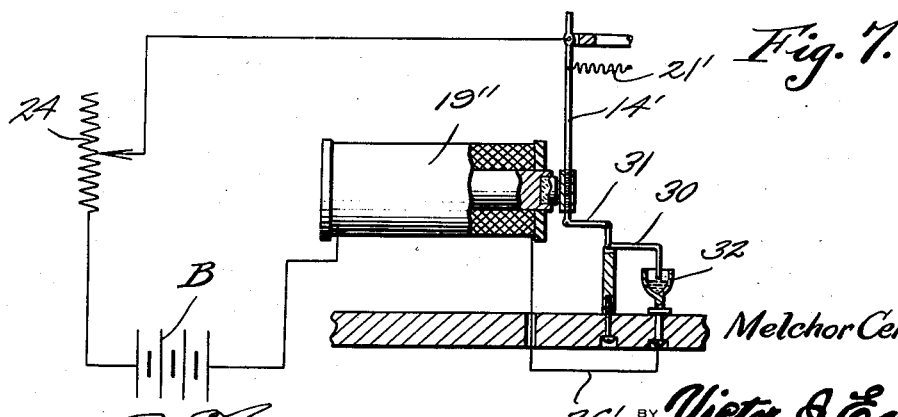

Feb. 12, 1929.

MELCHOR CENTENO, V.

1,702,195

PHOTO OSCILLATOR

Filed May 25, 1927     3 Sheets-Sheet 3

Patented Feb. 12, 1929.

1,702,195

UNITED STATES PATENT OFFICE.

MELCHOR CENTENO, V., OF CAMBRIDGE, MASSACHUSETTS.

PHOTOOSCILLATOR.

Application filed May 25, 1927. Serial No. 194,193.

This invention relates to improvements in television devices, the general object of the invention being to provide improved means for transforming the light vibrations of the receiving lamp into an image on a screen or the like through means of a mirror and electro-magnetic means for vibrating the same.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a diagrammatic perspective view showing one form of the invention.

Figure 2 is a section on line 2—2 of Figure 1.

Figure 3 is an enlarged view showing the means for supporting the mirror.

Figure 4 is a diagrammatic view of the circuit.

Figure 5 is a section on line 5—5 of Figure 6, and showing another form of the invention.

Figure 6 is a section on line 6—6 of Figure 5.

Figure 7 is a diagrammatic view of the circuit of the form of the invention shown in Figures 5 and 6.

Figure 8:
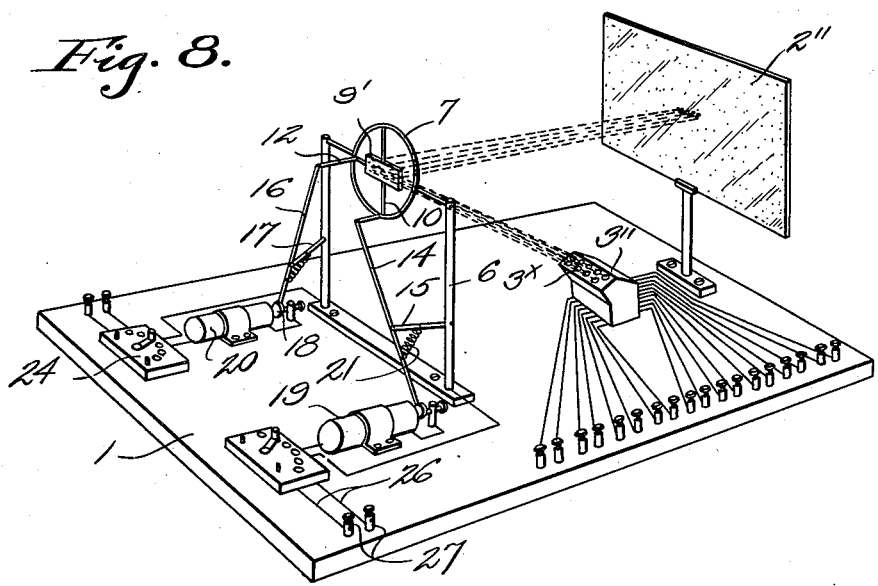
Figure 8 is a view similar to Figure 1, but showing another form of the invention.

Referring to the figures showing the first form of the invention, 1 indicates a base which supports the screen 2 which may be of transparent or translucent material, and this base also supports the telerama lamp 3 which transforms the electric impulses coming from the sending device into light impulses, the conductors of this lamp being shown at 4 and their terminals at 5.

The base also supports a pair of uprights 6 which, at their upper ends, support a ring 7 through means of the rods 8 in such a manner that the ring can rotate about its horizontal axis. A mirror 9 is supported within the ring by the rods 10 in such a manner that it can rotate about its vertical axis. A rod 11 is connected with the lower part of the ring and a rod 12 is connected to an arm 13 which is connected with the mirror.

A lever 14 is pivoted intermediate its ends to an arm 15 carried by one of the uprights and a similar lever 16 is pivoted to an arm 17 carried by the other upright. An armature 18 is connected with the lower end of each lever and magnets 19 and 20 are carried by the base and are arranged adjacent the armatures so as to attract the same when the magnets are energized. A spring 21 connects the lower end of each lever with its arm and tends to hold the lever in a position with its armature bearing against an adjusting screw 22 carried by the post 23 on the base. Thus the extent of movement of the armature can be adjusted through means of this screw.

A variable resistance 24 is located in the circuit of each magnet, these resistances being placed on the base. The conductors are shown at 26 and their terminals at 27, the terminals 27 being connected to a battery B, as shown in the diagrammatic view (Figure 4), which shows the circuit of one of the magnets and the lever operated by the magnet.

As shown in this diagrammatic view, the circuit will be closed when the armature is resting against the set screw, as this screw is electrically connected with the magnet, as shown in Figures 1 and 4, and the armature is connected with the battery, as shown in Figure 4, but as soon as the armature is attracted by the magnet and moves away from the set screw, the circuit will be broken and then the spring 21 brings the armature back against the set screw and thus completes the circuit again. Thus the lever 16 will be vibrated by the magnet and the vibrations can be regulated through means of the resistance 24 and the set screw 22. The vibrations of the lever 14 will vibrate the ring 7 about its horizontal axis and these vibrations will be communicated to the mirror while the vibrations of lever 16 will cause the mirror to vibrate about its vertical axis so that the mirror is rocked about its horizontal axis and also about its vertical axis.

The mirror is so positioned that it will reflect the rays of light coming from the lamp 3 upon the screen 2, as shown by the lines $a$ in Figure 1.

As an example of how the device operates, we will say the image or picture to be sent is "traced" by the explorer of the sending apparatus in $\frac{1}{16}$ of a second, the image being patterned in thirty traces parallel to each other, and in each trace there are twenty details of the image. The number of details to be transmitted is thus 30 x 20, which equals 600 details. As they are transmitted in $\frac{1}{16}$ of a second (successively, not simultaneously), there must be 9600 light impulses per second in the photo-electric transmitting cell. Of course, the actual number of details necessary to produce a proper impression would be much greater, about 200,000 per second. These impulses are transformed into electric impulses and are sent over wires or wireless to the receiving station where they are converted back into light impulses, and these light impulses are directed by the lamp 3 on to the mirror 9 and are reflected by said mirror upon the screen 2. Thus in order to reproduce the image on the screen, the electro-magnet 20 must cause the lever 16 to vibrate at the rate of 240 vibrations per second and electro-magnet 19 must vibrate lever 14 at the rate of 8 vibrations per second, and as before explained, these vibrations are communicated to the mirror 9 since these vibratory motions are simultaneous, and the angle of vibration is well calculated. The spot of light thrown upon the screen 2 by the mirror 9 will trace the screen in $\frac{1}{16}$ of a second, with 30 vertical traces. The rate of vibration must be greater for the electro-magnet 19 than the other electro-magnet, since there must be over 200,000 vibrations per second in order to get a clear image. The lines $a$ on the screen 2 in Figure 1 show how the rays of light trace the image on the screen.

Figures 5 and 6 show a practical way of arranging the parts of the invention in a casing 28. As shown in these views, the screen 2' is placed in an opening in the front of the casing and the knobs 29 for adjusting the resistance 24' have their stems passing through said front. The mirror supporting means are placed adjacent the center of the casing in rear of the lamp 3' so that the mirror will reflect the rays from said lamp upon the screen 2'. The electro-magnets 19' and 20' are placed in the rear part of the casing.

Figure 7 shows a modified way of breaking the circuit of the magnetic means. In this view, a bell crank 30 is pivotally supported from the base and is connected to the lower end of each lever by a link 31, the opposite end of the bell crank dipping into a cup 32 containing mercury and which is electrically connected with the magnet 19" by the conductor 26'. Thus when the lever 14' is pulled back by its spring 21', the bell crank will dip into the mercury in the cup 32 and thus complete the circuit to the magnet, but as the lever 14' moves toward the magnet, the bell crank will be locked so that its end will raise out of the mercury and thus the circuit will be broken.

Figure 9:
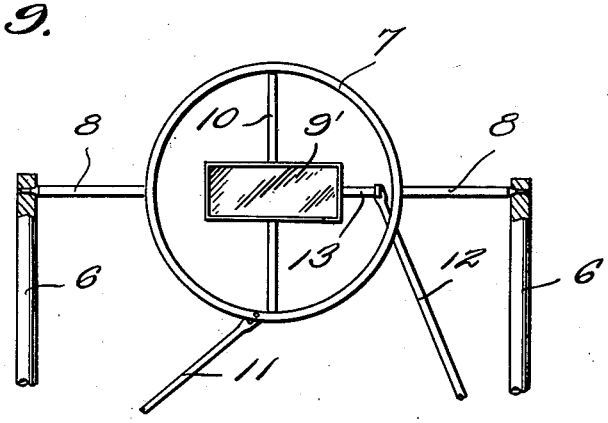
Figure 9 is a view of the supporting means of the mirror of Figure 8.

Figures 8 and 9 show how the invention is carried out when the lamp 3" is arranged to project a plurality of traces. As shown in these figures, the mirror is made of rectangular shape, as shown at 9" so that it will receive the rays coming from all the openings $3^x$ in the lamp and reflect them upon the screen 2" in the same manner as the single spot of light is reflected from the lamp shown in Figure 1.

This invention is intended to be substituted for the rotating disk or ribbon now in use in receiving stations in apparatus of this knd.

What I claim is:—

1. In a television apparatus, a receiving device including a lamp, a screen and a mirror for transmitting the rays of light from the lamp to the screen, means for supporting the mirror so that it can vibrate about its horizontal axis and about its vertical axis, a lever connected with the mirror for moving the same about its vertical axis, a second lever connected with the mirror for moving the same about its horizontal axis, magnetic means for vibrating each lever the armature of such means being carried by the lever, an adjustable stop for regulating the extent of movement of each lever, a spring for holding each lever with the armature out of contact with its magnet against the stop and a circuit for each magnetic means including a part of the stop.

2. In a television apparatus, a receiving device including a lamp, a screen and a mirror for transmitting the rays of light from the lamp to the screen, means for supporting the mirror so that it can vibrate about its horizontal axis and about its vertical axis, a lever connected with the mirror for moving the same about its vertical axis, a second lever connected with the mirror for moving the same about its horizontal axis, magnetic means for vibrating each lever the armature of such means being carried by the lever, an adjustable stop for regulating the extent of movement of each lever, a spring for holding each lever with the armature out of contact with its magnet against the stop, a circuit for each magnetic means including a part of the stop and a variable resistance in each circuit.

In testimony whereof I hereby affix my signature.

MELCHOR CENTENO, V.